(12) United States Patent
Elshafie et al.

(10) Patent No.: US 12,445,171 B2
(45) Date of Patent: Oct. 14, 2025

(54) REFORMULATING RECONFIGURABLE INTELLIGENT SURFACE (RIS) ELEMENTS BASED ON OPERATION FREQUENCY

(71) Applicant: QUALCOMM Incorporated, San Diego, CA (US)

(72) Inventors: Ahmed Elshafie, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/547,272

(22) PCT Filed: Apr. 29, 2021

(86) PCT No.: PCT/CN2021/090904
§ 371 (c)(1),
(2) Date: Aug. 21, 2023

(87) PCT Pub. No.: WO2022/226874
PCT Pub. Date: Nov. 3, 2022

(65) Prior Publication Data
US 2024/0137077 A1    Apr. 25, 2024

(51) Int. Cl.
*H04L 23/02*    (2006.01)
*H04B 7/04*    (2017.01)
(Continued)

(52) U.S. Cl.
CPC ......... *H04B 7/04013* (2023.05); *H04B 7/043* (2013.01); *H04B 7/0617* (2013.01)

(58) Field of Classification Search
CPC .. H04B 7/0617; H04B 7/0456; H04B 7/0626; H04B 7/0408; H04B 7/6966; H04B 5/48;
(Continued)

(56) References Cited

U.S. PATENT DOCUMENTS

2023/0208486 A1* 6/2023 Dai ................... H04B 7/04013
                                                    370/315
2023/0246674 A1* 8/2023 Åström ................ H04B 7/145
                                                    375/262

(Continued)

FOREIGN PATENT DOCUMENTS

EP         2822099 A1    1/2015

OTHER PUBLICATIONS

International Search Report and Written Opinion—PCT/CN2021/090904—ISA/EPO—Nov. 22, 2021.

(Continued)

*Primary Examiner* — Khai Tran
(74) *Attorney, Agent, or Firm* — Patterson + Sheridan, L.L.P./Qualcomm

(57) ABSTRACT

Aspects of the present disclosure provide apparatus, methods, processing systems, and computer readable mediums for determining a beamformer to apply to groups of two or more elements of a reconfigurable intelligent surface (RIS). The beamformer is applied to the groups of elements of the RIS to facilitate communications at the operating frequency by re-radiating radio signals via the elements of the RIS. For example, by grouping RIS elements in different manners and applying a beamformer (e.g., precoding weights) to the group as if the group were a single RIS element, the RIS can be reconfigured to behave differently to suit various operating frequencies of the radio signals.

28 Claims, 10 Drawing Sheets

(51) Int. Cl.
*H04B 7/0426* (2017.01)
*H04B 7/06* (2006.01)
(58) Field of Classification Search
CPC ... H04B 7/0413; H04W 16/28; H04W 72/046
USPC .................................... 375/262, 260, 267
See application file for complete search history.

(56) References Cited

U.S. PATENT DOCUMENTS

2024/0031980 A1* 1/2024 Duan .................... H04W 68/00
2024/0413868 A1* 12/2024 Haghighat .......... H04L 25/0204

OTHER PUBLICATIONS

Zheng B., et al., "Intelligent Reflecting Surface-Enhanced OFDM: Channel Estimation and Reflection Optimization", arxiv.org, Cornell University Library, 201, Olin Library Cornell University Ithaca, NY 14853, IEEE Wireless Communications Letters, IEEE, Piscataway, NJ, USA, vol. 9, No. 4, Dec. 20, 2019 (Dec. 20, 2019), pp. 518-522, XP011782311, ISSN: 2162-2337, DOI: 10.1109/LWC.2019. 2961357 [retrieved on Apr. 8, 2020], The whole document.

* cited by examiner

| Received Metric 1 | Precoding Setting 1 | Reference Signal 1 |
| --- | --- | --- |
| Received Metric 2 | Precoding Setting 2 | Reference Signal 2 |
| Received Metric 3 | Precoding Setting 3 | Reference Signal 3 |
| Received Metric 4 | Precoding Setting 4 | Reference Signal 4 |
| ⋮ | ⋮ | ⋮ |
| Received Metric k-1 | Precoding Setting k-1 | Reference Signal k-1 |
| Received Metric k | Precoding Setting k | Reference Signal k |

600

DETERMINE, BASED ON AN OPERATING FREQUENCY, A BEAMFORMER TO APPLY TO GROUPS OF TWO OR MORE OF ELEMENTS OF A RECONFIGURABLE INTELLIGENT SURFACE (RIS) — 602

APPLY THE BEAMFORMER TO THE GROUPS OF ELEMENTS OF THE RIS TO FACILITATE COMMUNICATIONS AT THE OPERATING FREQUENCY BY RE-RADIATING RADIO SIGNALS VIA THE ELEMENTS OF THE RIS — 604

FIG. 6

REFORMULATING RECONFIGURABLE INTELLIGENT SURFACE (RIS) ELEMENTS BASED ON OPERATION FREQUENCY

CROSS-REFERENCE TO RELATED APPLICATIONS

This application is a national stage application under 35 U.S.C. 371 of PCT/CN2021/090904 filed Apr. 29, 2021, which is hereby expressly incorporated by reference herein in its entirety as if fully set forth below and for all applicable purposes.

INTRODUCTION

Aspects of the present disclosure relate to wireless communications, and more particularly, to reconfigurable intelligent surface (RIS) and related beamforming techniques.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description" one will understand how the features of this disclosure provide advantages that include improved communications between devices in a wireless network.

Certain aspects provide a method for wireless communications by a wireless communication device. The method generally includes determining, based on an operating frequency, a beamformer to apply to groups of two or more of elements of a reconfigurable intelligent surface (RIS). The method further includes applying the beamformer to the groups of elements of the RIS to facilitate communications at the operating frequency by re-radiating radio signals via the elements of the RIS.

Certain aspects provide a wireless communication device including a memory and a processor coupled to the memory. The memory and the processor are generally configured to determine, based on an operating frequency, a beamformer to apply to groups of two or more of elements of a reconfigurable intelligent surface (RIS); and apply the beamformer to the groups of elements of the RIS to facilitate communications at the operating frequency by re-radiating radio signals via the elements of the RIS.

Certain aspects provide a device for wireless communication. The device generally includes means for determining, based on an operating frequency, a beamformer to apply to groups of two or more of elements of a reconfigurable intelligent surface (RIS); and means for applying the beamformer to the groups of elements of the RIS to facilitate communications at the operating frequency by re-radiating radio signals via the elements of the RIS.

Certain aspects of the present disclosure provide a non-transitory computer readable medium storing instructions that when executed by a computing device as discussed herein cause the computing device to communicate wirelessly. For example, the non-transitory computer readable medium stores instructions that, when executed by a computing device, cause the computing device to determine, based on an operating frequency, a beamformer to apply to groups of two or more of elements of a reconfigurable intelligent surface (RIS). The non-transitory computer readable medium stores instructions that, when executed by a computing device, further cause the computing device to apply the beamformer to the groups of elements of the RIS to facilitate communications at the operating frequency by re-radiating radio signals via the elements of the RIS.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 6 is a flow diagram illustrating example operations by a RIS controller (e.g., a BS or UE) to configure a computing device to use a particular beamforming type, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
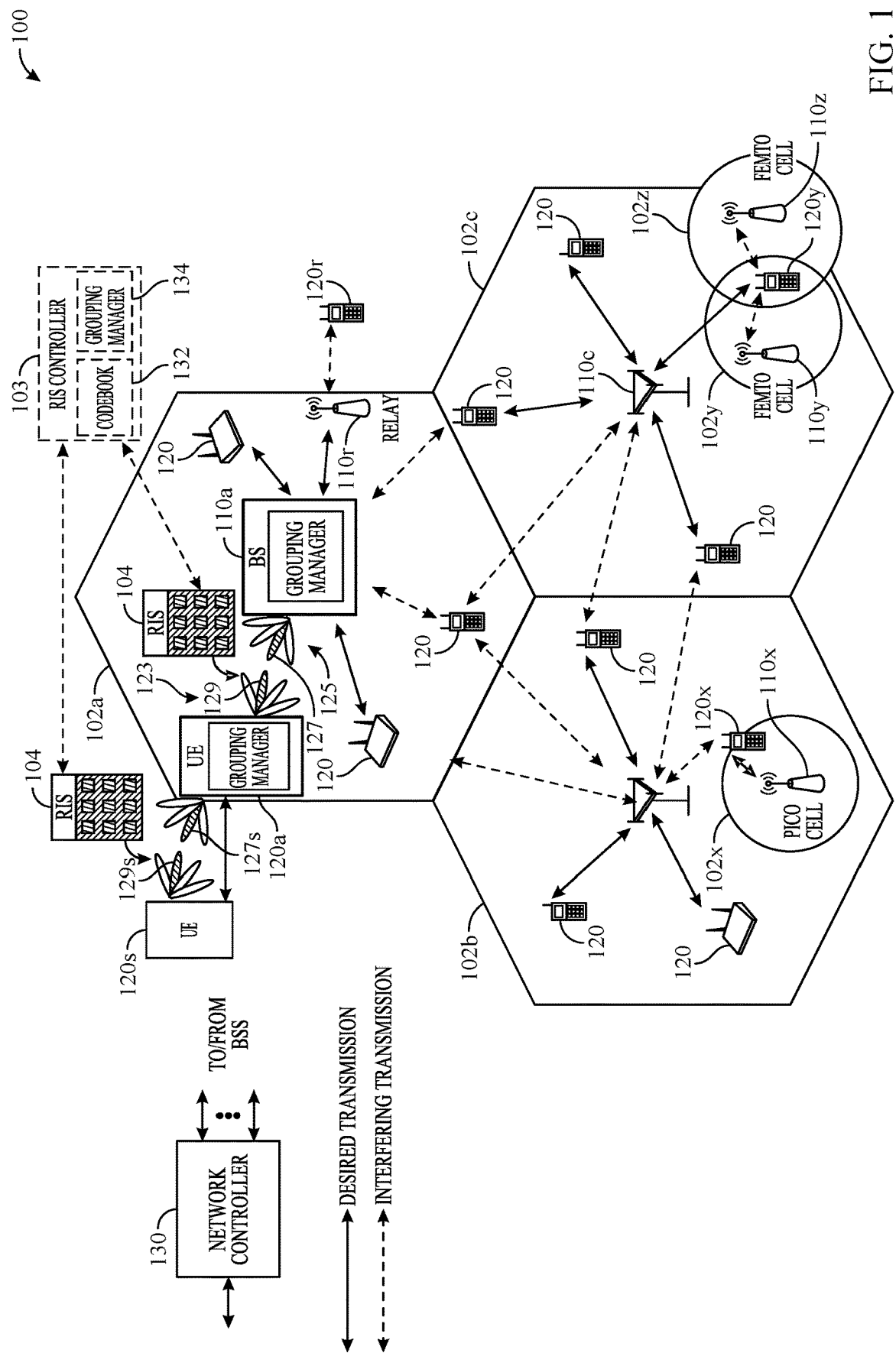
FIG. 1 is a block diagram conceptually illustrating an example telecommunications system, including a reconfigurable intelligent surface (RIS), in accordance with certain aspects of the present disclosure.

Aspects of the present disclosure provide apparatus, methods, processing systems, and computer readable mediums for determining a beamformer to apply to groups of two or more elements of a reconfigurable intelligent surface (RIS). The beamformer is applied to the groups of elements of the RIS to facilitate communications at the operating frequency by re-radiating radio signals via the elements of the RIS. For example, by grouping RIS elements in different manners and applying a beamformer (e.g., precoding weights) to the group as if the group were a single RIS element, the RIS can be reconfigured to behave differently to suit various operating frequencies of the radio signals. A beamformer may include two or more sets or groups of precoding weights corresponding to two or more groups of RIS elements. A beamformer may be understood as one or more precoders or precoding. In some cases, a "beamformer" and "beamformers" are used interchangeably in view of the inherent plural meaning.

A RIS may be configured to facilitate communications at an original frequency $f_0$ by re-radiating radio signals via the elements of the RIS. At a high level, a RIS includes a number of elements (referred to as RIS elements), which form a surface that may be integrated into different objects such as walls, sidings, clothes, etc. The RIS elements are reconfigurable scatterers, including antennas that receive and re-radiate (e.g., reflect or refract) radio wave signals. The RIS elements may be passive, such that no external power is required for the re-radiation, and such that the re-radiation is configurable with a phase shift for each RIS element. The RIS element may also be active, such that the re-radiation may change the amplitude in addition to the phase shift. The RIS elements may therefore perform constructive interference that resembles beamforming and re-radiate beams in certain directions from a transmitter (e.g., a UE or BS) toward a receiver (e.g., a BS or UE). Such beamforming or precoding of the RIS elements is controlled by identifying phase shift values, or weights, to be applied to corresponding RIS elements given specific conditions of the transmitter and the receiver. Various methods may achieve applying a phase shift value or weight to a RIS element, such as by controlling an input voltage to RIS elements that are varactors (e.g., tuning diodes or voltage controlled capacitor). Other inputs maybe used to control the phase shift or amplitude change of the RIS elements depending on specific element types.

Each of the RIS elements may have an area A inversely proportional to the original frequency squared: $f_0^2$ (i.e., proportional to the wavelength squared: $\lambda^2$). The relationship between the RIS element area A and the wavelength $\lambda$ is often by design. For example, for a RIS element (i.e., an antenna for reflection or refraction) to effectively change the direction of an incoming radio signal, the size of the RIS element is usually determined based on a fraction of the wavelength $\lambda$ of the incoming radio signal. Such relationship between the RIS element size and the wavelength $\lambda$ enables design optimization of the re-radiation efficiency, signal strength, and other aspects of the RIS deployment.

The RIS element may take on different shapes. When the RIS element is a rectangle, the dimensions of the RIS element may be $\lambda/r_1$ for the width and $\lambda/r_2$ for the length, $r_1$ and $r_2$ each being a design constant or factor (e.g., an integer greater than one). When the RIS element is a square, the side of the square may be $\lambda/r$, r being a design constant or factor. When the RIS element is circular in shape, the radius of the circle may be $\lambda/r$, r being a design constant or factor. Other shapes of the RIS element may also have dimensions based on the wavelength $\lambda$.

Because of the relationship between the size design of the RIS elements and the wavelength $\lambda$, the RIS design may be optimized for an expected operating frequency $f=c/\lambda$, c being the speed of light. The expected operating frequency is usually the highest frequency (i.e., the original frequency $f_0$) in a selected frequency range.

The present disclosure provides techniques for effectively reformulating the configuration RIS elements such that the same RIS may be reconfigured to emulate an optimized design of the RIS elements for radio signals of a different frequency $f_{operating\ frequency}$ than $f_0$. As such, the beamformer of the RIS may be more effective and/or efficient when operating at a frequency different from the original frequency (e.g., operating in FR1 when the RIS is designed using a frequency in FR2).

Techniques herein relate to reformulating, such as by grouping, RIS elements to apply beamformers (e.g., different precoding weights) for operating frequencies that may be different from the frequency used in designing the size of the RIS element. The techniques herein may be used for beamforming RIS elements of any suitable wireless communication device, such as antennas of a UE or BS, or RIS elements of a RIS. A wireless communication device is a type of computing device that performs wireless communication. In some aspects, a wireless communication device may also have a wired connection to perform wired communications.

In aspects that may take advantage of the techniques of this disclosure, a RIS may be configured to support codebook based or non-codebook based beamformer and may not change to a different beamformer scheme during operation. The present disclosure provides signaling techniques to allow the RIS controller to change the type of beamformer to be used at the RIS. For example, the RIS controller may use codebook based and non-codebook based beamformers at different times, such as based on receiving indications of durations for which to use corresponding precoding types. In some cases, a wireless communication device, may signal such indications. In certain aspects, the indications may include a sequence of transitioning/switching of precoding types and the corresponding durations. Details of various implementations are presented below.

The RIS controller may use wireless or wired communications to configure the configured device (e.g., the RIS) in various aspects. Further, in certain aspects, the RIS elements of the configured device may be integrated with the configured device, or may be coupled to the configured device by a connection (e.g., wired connection). For example, a RIS controller may be coupled to the RIS elements that it controls by beamformer. The combination of a RIS controller and RIS elements, may simply be referred to as a RIS. Certain aspects are discussed herein with respect to a RIS controller as the configured device, and RIS elements as RIS elements, however it should be understood that such aspects can similarly be applicable to other configured devices and/or RIS elements.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the network 100 may include a RIS controller 103 with a grouping manager 134 configured to perform operations of FIG. 6 to reconfigure RIS elements of a RIS 104.

The wireless communication network 100 may be a New Radio (NR) or 5G network. As shown in FIG. 1, a user equipment (UE), such as the UE 120 (e.g., including the UEs 120a and 120s) in the wireless communication network 100 communicates with a serving base station (BS), such as the BS 110a in a cell 102a in the wireless communication network 100. The UE 120a may be configured with multiple transmission configurations (e.g., antenna arrays/panels and/or beams) for uplink transmission to the BS 110a. In some cases, the UE 120a may be configured with multiple transmission configurations for sidelink transmission to another UE 120s.

Figure 2:
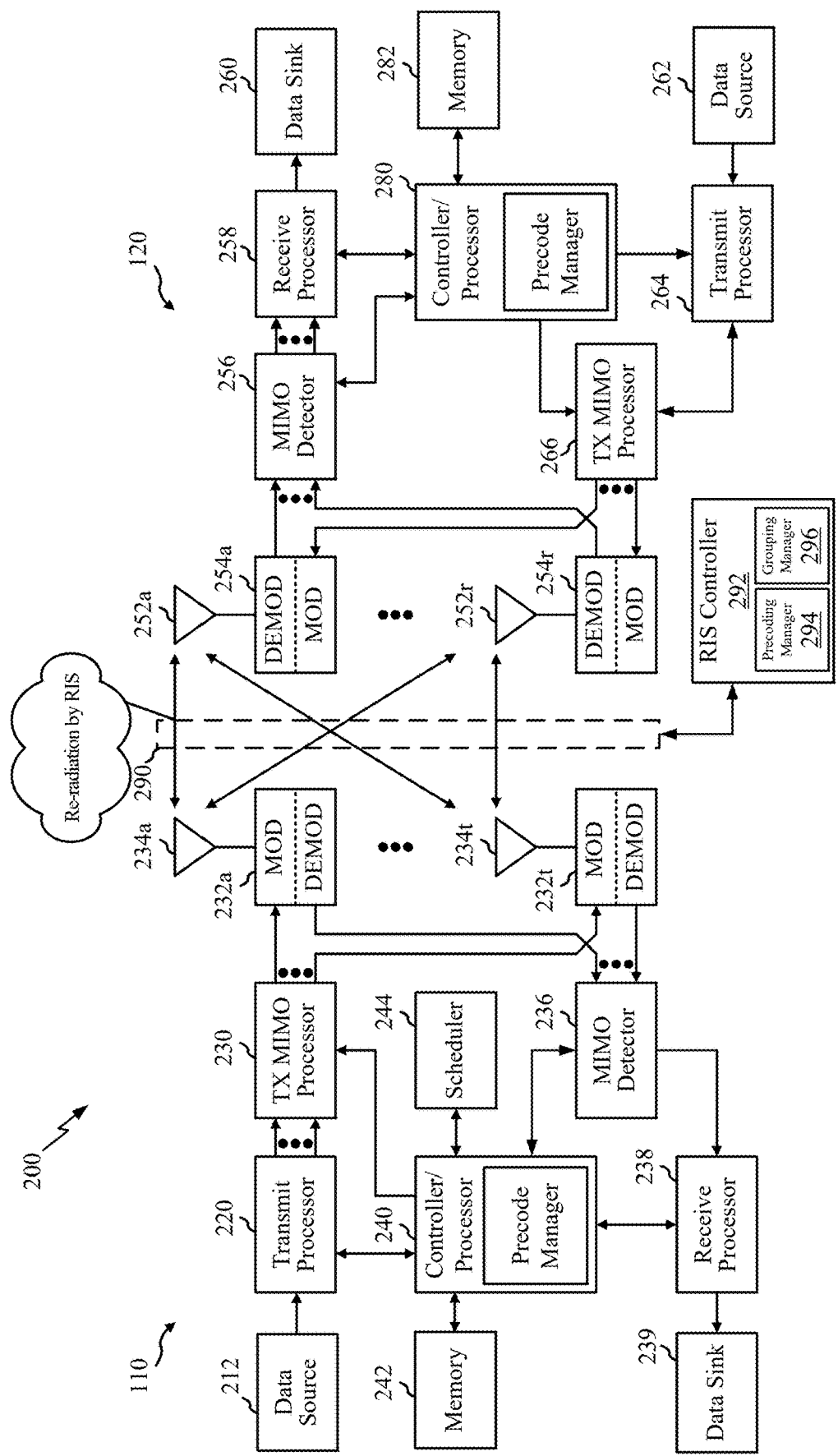
FIG. 2 is a block diagram conceptually illustrating a design of an example base station (BS), user equipment (UE), and RIS, in accordance with certain aspects of the present disclosure.

In certain aspects, communication between the BS 110a (e.g., gNB) and the UE 120a may be blocked by obstacles and require assistance from a reconfigurable intelligent surface (RIS) 104 (also shown in FIGS. 2 and 3). The RIS 104 enables communications between the BS 110a and UE 120a to be received and re-radiated, thereby avoiding the obstacles. For example, the RIS 104 may be configured with a codebook for precoding one or more elements thereon (referred to as RIS elements) to allow a beam from one of the BS 110a and UE 120a (e.g., a transmitter) to be re-radiated off the RIS to reach the other one of the BS 110a and UE 120a (e.g., a receiver). The direction of the re-radiation by the RIS 104 may be controlled or reconfigured by the RIS controller 103 of the RIS 104.

The RIS controller 103 includes a codebook 132 and a grouping manager 134 for applying a beamformer (e.g., precoding weights) according to grouping of RIS elements, such as beamformer two or more RIS elements as if they were one. The codebook 132 includes values of weights to configure each RIS element (or each group of RIS elements) to modify the radio signal re-radiated by each RIS element, such as weight shifting or changing amplitudes. The grouping manager 134 may determine different grouping schemes, according to different operating frequencies, and/or when provided indications or under different conditions.

In an example, when the UE 120a is the transmitter and communicates with the BS 110a (e.g., over a wireless Uu interface), the BS 110a is the receiver that provides the RIS controller 103 feedback for selecting beamformer values for the RIS elements. Similarly, when the UE 120a establishes a sidelink (e.g., PC5 interface) with the UE 120s, the UE 120a may be the transmitter and the UE 120s may be the receiver that provides the RIS controller 103 feedback. The codebook 132 may be generated based on specific settings of the BS 110a and the UE 120a, and based on different parameters specific to situations. The present disclosure provides techniques for generating or designing the codebook 132.

The feedback from the receiver to the RIS controller 103 allows for the selection of beamformer values for reflecting communications between the transmitter and the receiver. For example, the UE 120a may send a series of reference signals (RSs) in one or more directions 129. Via the re-radiation (e.g., reflection or refraction) by the RIS 140, the BS 110a receives the RSs. The re-radiation by the RIS is controlled by a RIS controller that may apply different weights to the RIS elements, causing different phase shifts, and therefore different beamforming characteristics for the RSs to reach the BS 110a. The BS 110a may evaluate the RSs using one or more metrics, such as a signal strength, an energy level, a signal to noise ratio (SNR), a channel quality indicator (CQI), or a reference signal received power (RSRP).

The BS 110a may use one of the metrics as feedback to inform the RIS controller 103 on which set of weights may be preferred for communication between the UE 120a and the BS 110a. Similarly, the BS 110a may be a transmitter and send RSs in one or more directions 127 for the UE 120a to receive. When training with a RIS controller in sidelink situations, the UE 120s may be a transmitter and send RSs in one or more directions 129s; and the UE 120a may be a transmitter and send RSs in one or more directions 127s. Other configurations in system 100 can be similarly setup between the UEs 120 and BSs 110.

The BS 110a and the UE 120a may respectively include a grouping manager for providing information regarding operation frequency and/or reference beamformer configuration on grouping of RIS elements to the RIS controller 103. The respective grouping managers may determine and/or generate signaling for indicating the grouping of RIS elements and/or the beamformer for the RIS element groups.

As illustrated in FIG. 1, the wireless communication network 100 may include a number of BSs 110 and other network entities. A BS may be a station that communicates with UEs. Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110*r* may communicate with the BS 110*a* and a UE 120*r* in order to facilitate communication between the BS 110*a* and the UE 120*r*. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*a*, 120*s*, 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with beamformer may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

FIG. 2 illustrates example components of BS 110 and UE 120 (as depicted in FIG. 1), which may be used to implement aspects of the present disclosure. As shown, the RIS 290 may assist the communications, by receiving and re-radiating radio signals, between the BS 110 and UE 120, such as when such communications are impeded or blocked by obstacles (not shown, illustrated as the blockage in FIGS. 3A and 3B). For example, the RIS 290 may re-radiate the transmissions from one of the BS 110 or UE 120 to the other using reflection, refraction, or other passive or active mechanisms.

The RIS 290 may be reconfigured or controlled by a RIS controller 292. Each RIS element may re-radiate radio signals with certain phase or amplitude changes, such as phase shifts. The RIS controller 292 may reconfigure the phase or amplitude changes by applying a beamformer weight to each RIS element or a group of RIS elements to enable the RIS 290 to re-radiate an output beam at different directions given a particular input beam.

Figure 3A:
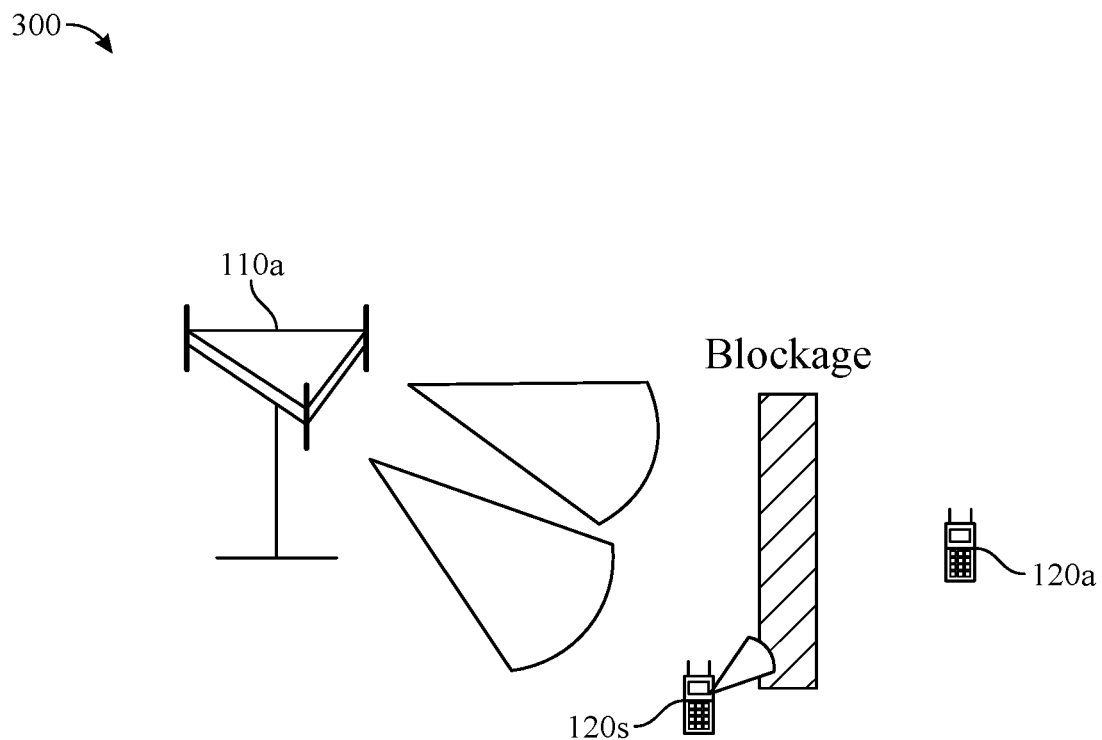
FIG. 3A illustrates an example of communication blockage between wireless communication devices.
Figure 3B:
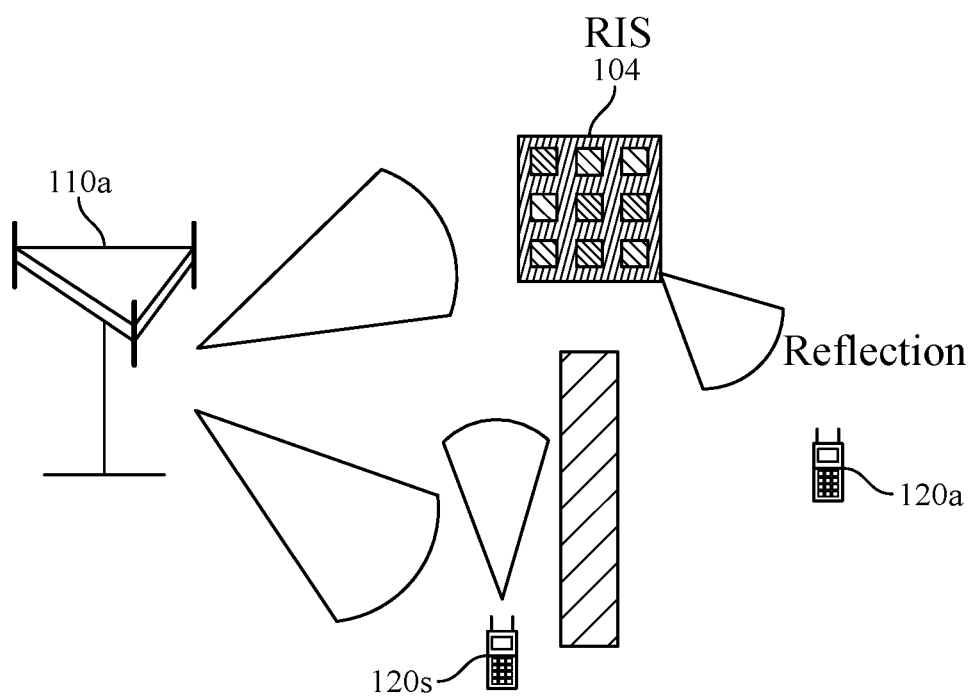
FIG. 3B illustrates an example of using a RIS to overcome impediment by obstacles between a BS and a UE, according to certain aspects of the present disclosure.

An illustrative deployment example of the RIS 290 is shown in FIG. 3B. According to the present disclosure, the RIS controller 292 includes a grouping manager 296 and a beamformer manager 294. The grouping manager 296 may determine, based on an operating frequency, a beamformer to apply to groups of two or more of elements of the RIS 290. For example, the grouping manager 296 may determine how to group two or more RIS elements to emulate RIS performances for different operating frequencies. The beamformer manager 294 may apply the beamformer to the groups of elements of the RIS to facilitate communications at the operating frequency by re-radiating radio signals via the elements of the RIS. In some cases, the beamformer manager 294 may also select or generate codebooks specific to incoming reference signals, such as the reference signals transmitted by a transmitter (either the BS 110 or the UE 120). The generated codebooks may be stored in the RIS controller 292 for future use in conditions similar to when the codebooks are generated.

The antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. Although the present disclosure uses RIS as an example of implementing the beamformer techniques, the techniques may apply to another form of cooperative communications, such as transparent relaying or regenerative relaying implementations. As shown in FIG. 2, the controller/processor 280 has a grouping manager that may indicate a precoding type to a RIS controller 292 configured to adjust weights on the RIS elements, as described in more detail herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., beamformer) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110.

At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The processor 240 and/or other processors and modules at the BS 110 may perform or direct the execution of processes for the techniques described herein. For example, as shown in FIG. 2, the processor 240 has a grouping manager that may indicate precoding types to a RIS controller 292 configured to adjust weights on the RIS elements, as described in more detail herein. The memories 242 and 282 may store data and program codes for BS 110 and UE 120, respectively. A scheduler 244 may schedule UEs for data transmission on the downlink and/or uplink.

Example Application and Beamformer of
Reconfigurable Intelligent Surface (RIS)

As discussed above, massive multiple input multiple output (MIMO) configuration increases throughput. For example, MIMO can achieve high beamforming gain by using active antenna units and can operate with individual radio frequency (RF) chains for each antenna port. To further such advantages and extend coverage, RISs may be deployed to reflect impinging waves in desired directions. In some cases, RISs may operate without substantial power consumption when they operate passively to only reflect or refract beams from the transmitter toward the receiver. In some cases, the reflection or refraction direction may be controlled by gNB or a monitoring sidelink UE.

FIG. 3A illustrates an example of communication blockage between wireless communication devices. As shown, impeded by a blockage, a first network entity (BS 110a) may only transmit to the UE 120s as transmissions may not reach the UE 120a, as the blockage prevents signals from reaching the UE 120a. The blockage also prevents the UE 120s from establishing sidelink communications with the UE 120a. As such, the UE 120a may not communicate with the BS 110a via the UE 120s using sidelink.

FIG. 3B illustrates an example of using a RIS 104 to overcome the blockage, according to certain aspects of the present disclosure. As shown, a RIS 104 is introduced to reflect or otherwise re-radiate the radio signals to bypass the blockage. For example, the two-way communications between the BS 110a and the UE 120a are enabled by the RIS 104 re-radiating one or more beams from the BS 110a toward UE 120a and vice versa. Furthermore, the RIS 104 can also be reconfigured, such as with different beamformer values, to enable the UEs 120s and 120a to establish sidelink communications.

Figure 4:
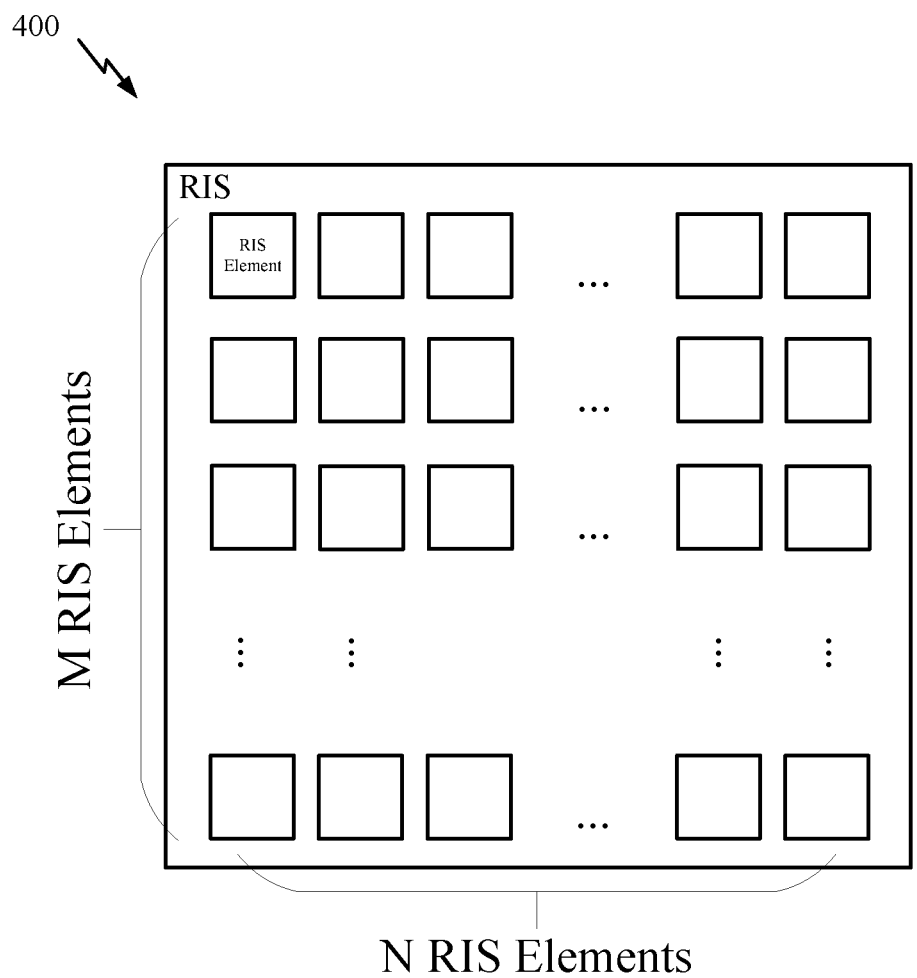
FIG. 4 illustrates an example arrangement of RIS elements, in accordance with certain aspects of the present disclosure.

The RIS 104 may perform passive beamforming. For example, the RIS 104 may receive signal power from the transmitter (e.g., the BS 110a, UE 120a, or UE 120s) proportional to the number of RIS elements thereon. When the RIS 104 reflects or refracts the radio signal, the RIS elements cause phase shifts to perform conventional beamforming or beamformer. The phase shifts are controlled by beamformer weights (e.g., a multiplier or an offset of time delay) applied to the RIS elements. For an array of RIS elements, such as an m×n rectangular matrix, for example, a respective beamformer weight may be generated or specified for each of the RIS element by the RIS controller. An example of the RIS elements are illustrated in FIG. 4, as further discussed below.

The size of each of the RIS elements may be designed based on an intended operating frequency (referred to as the original frequency). For example, the wavelength corresponding to the original frequency may be used as a baseline for determining the dimension of each RIS element. When the RIS element has a form factor as a square, the side length may be the wavelength multiplied by a constant, usually a fraction r. The constant is selected based on efficiency and/or reliability. Therefore, the performance of a RIS may be limited to its original frequency presumed in designing the RIS element sizes, resulting the RIS being less efficient or effective at a different operating frequency.

The present disclosure provides techniques for reformulating RIS elements (e.g., by grouping two or more RIS elements as one) to emulate performance for different operational frequencies. For example, a group of RIS elements is reformulated to behave as a single RIS element native to an operational frequency different from the original frequency.

Example RIS Elements Grouping and Reformulation

The present disclosure provides techniques for applying a beamformer to a group of RIS elements determined based on an operating frequency. For example, the RIS elements may be designed to operate at an original frequency and have a size determined based on the wavelength corresponding to the original frequency. The disclosed techniques allow for reformulating the RIS elements, for example, to operate at a different operational frequency (e.g., lower than the original frequency) such that the RIS elements are precoded in groups to behave as a single RIS element. In some aspects, the wireless communication device may perform training with the computing device, to identify a beamformer or precoding setting (including precoding types and/or specific precoding weights) for each or a group of multiple RIS elements.

In some aspects, a RIS controller may participate in training between a transmitter and a receiver, by applying different beamformers to one or more of the RIS elements, based on the codebook, while the transmitter transmits reference signals (RSs). The RSs are re-radiated by the RIS elements to reach the receiver, regardless whether the RSs would be blocked in a direct link between the transmitter and the receiver. The receiver sends the controller feedback (such as the feedback from the first wireless communication device shown in FIG. 5A). The beamformer applied to the one or more RIS elements for communications between the transmitter and the receiver are based on the feedback and the codebook generated by the controller.

An example of a RIS of an array of N×M RIS elements is shown in FIG. 4. The RIS controller may reconfigure the RIS by applying different beamformer weights to the RIS elements (or at least a subset thereof), such that the beam direction of re-radiation may be altered. In one example, the RIS controller may generate or select a codebook based or non-codebook based matrix of size N×M, where N is the number of horizontal elements and M is the number of vertical elements. Although FIG. 4 illustrates the RIS as a rectangular array, the disclosed beamformer techniques herein are applicable to RIS of various element layouts or patterns.

Figures 5A, 5B:
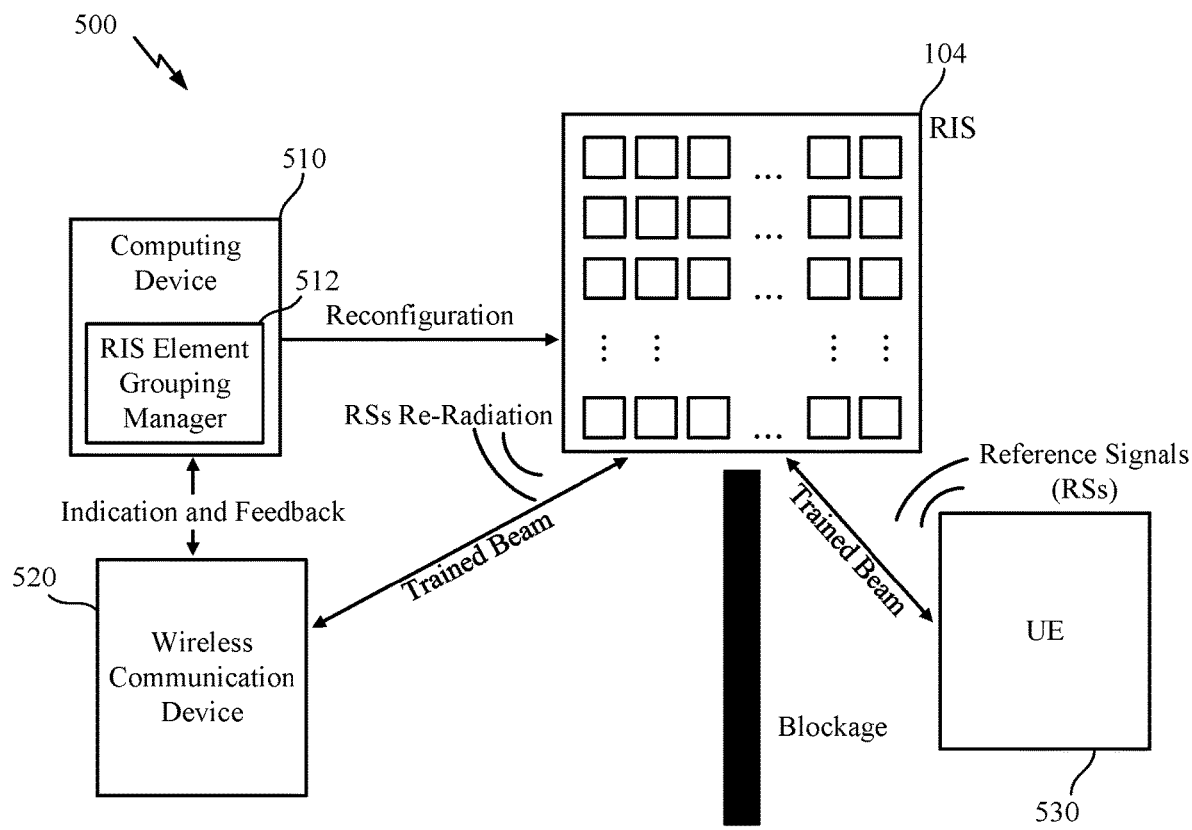
FIGS. 5A and 5B illustrate an example training operation for beamforming RIS elements, in accordance with certain aspects of the present disclosure.

FIGS. 5A and 5B illustrate an example training operation 500 for beamforming RIS elements. As shown in FIG. 5A, a wireless communication device 520 (e.g., the base station 110a or the sidelink UE 120s of FIG. 3A) may be blocked by the blockage from communicating directly with a UE 530 (or a second computing device or wireless communication device).

In the example shown in FIG. 5A, the UE 530 transmits reference signals (RSs) to the RIS 104's direction. Each RS may be transmitted during an RS occasion (e.g., a resource set (e.g., time) in which an RS is transmitted) and have an associated index that identifies the RS based on the RS occasion in which it is transmitted. The RIS 104 re-radiates, in a different beam direction, the RSs to the wireless communication device 520. Upon receiving the RSs, the wireless communication device 520 may provide indication and/or feedback to the computing device 510, in order to alter or update the precoding settings in search for an optimal beamformer configuration for the RIS 104.

The feedback to the computing device 510 may be provided at the end of the training operation 500, where an indication of one or more of the indices associated with one or more of the RSs are fed back to the computing device 510 (e.g., RIS's controller) and/or to the wireless communication device 520. For example, an indication of one or more indices of one or more RSs that have the best (e.g., highest) measured metrics (e.g., a signal strength, an energy level, a signal to noise ratio (SNR), a channel quality indicator (CQI), or a reference signal received power (RSRP)) may be fed back. Then, the computing device 510 may use that (e.g., best) precoder that is associated/was for the one or more RSs by the RIS 104, the wireless communication device 520, or the UE 530.

For example, as shown in FIG. 5B, assuming that a number of k training times/occasions corresponding to RS occasions (e.g., indices 1, 2, 3, . . . k) are used to transmit RSs, after receiving the reflected RS signals, the UE 530 measures a metric for each RS. At the end of the training, the UE 530 or the wireless communication device 520 may send the index (from 1 to k) of the RS occasion/RS having a best (e.g., highest) measured metric (e.g., occasion m). Alternatively, a set of RS occasions/RSs, such as l best (e.g., highest measure metric) RS occasions/RSs may be indicated by indexes by the UE 530 or the wireless communication device 520. Where a set of RS occasions/RSs are identified, different precoders used for the different RS occasions/RSs may be identified, and ranked in order of the ranking of the RS occasions/RSs identified. The computing device 510 may then use one of the identified precoders (e.g., associated with the highest ranking RS occasion/RS) in serving UE 530.

For example, the computing device 510 may include a RIS element grouping manager 512 for determining how to group or reformulate two or more RIS elements for use in different operating frequencies. In some cases, assuming the RSs sent from the UE 530 remain constant in values, frequency, and direction, changing the grouping of the RIS elements and the corresponding beamformer weight values may significantly change the RIS performance. The re-radiated RSs are measured at the wireless communication device 520, such as to measure certain metrics, such as energy or signal to noise ratios, for identifying a RS that optimizes such metrics. That RS may be associated with a particular precoding setting/weights at the RIS 104. Therefore, the wireless communication device 520 may indicate the RS to the RIS 104, and the associated beamformer weights may be used for communication between the wireless communication device 520 and the UE 530.

As shown in FIG. 5B, multiple different precoding settings (e.g., corresponding to each or a group of two or more RIS elements) may be applied to the RIS 104 with respect to the sequence of RSs. Correspondingly, the wireless communication device 520 may measure a receiving metric corresponding to each of the re-radiated RSs. As illustrated, for 1 through k RSs, the received metrics may be used to identify one precoding setting that generates an optimal value. The training process completes when the optimal value is identified for the pair of the first and second wireless communication devices with respect to the RIS 104. Upon completion, as shown in FIG. 5A, the wireless communication device 520 may communicate in a trained beam with the RIS 104, which may communicate in a trained beam with the UE 530.

In some aspects, the wireless communication device 520 may be a base station, such as BS 110 of FIG. 1, or a monitoring sidelink UE, such as UE 120a of FIG. 1. The UE 530 may be a corresponding UE in communication with the wireless communication device 520. The computing device 510 may be a RIS controller, such as a dedicated RIS controller wirelessly or by wire in communication with the RIS 104, or a component of the wireless communication device 520 (e.g., when a BS may directly control or reconfigure the RIS 104).

In some cases, The wireless communication device 520 and the UE 530 may agree on a sequence of indices of precoding settings to be used, based on the generation or selection of beamformer weights, so that at a reference signal j (sent at a certain time within a series of times) may be associated with the sequence of indices of weights. As such, the computing device 510 (e.g., the RIS controller) knows the corresponding beamformer weights and can correctly use or apply the weights.

FIG. 6 is a flow diagram illustrating example operations 600 for wireless communication, in accordance with certain aspects of the present disclosure. The operations 600 may be performed by a RIS controller (e.g., RIS controller 292 of FIG. 2) or a wireless communication device (e.g., the base station 110 or the UE 120 of FIGS. 1 and 2). For example, viewing FIGS. 3B and 5A together, the wireless communication device may be the BS 110a or the sidelink UE 120s, when the UE 120a is the second wireless communication device.

Operations 600 may be implemented as software components that are executed and run on one or more processors or processing components (e.g., controller/processor 240 or 280, or the grouping manager 296, of FIG. 2). Further, the transmission and reception of signals by the wireless communication device in operations 800 may be enabled, for example, by one or more antennas (e.g., antennas 234 or 238 of FIG. 2). In certain aspects, the transmission and/or reception of signals by the wireless communication device may be implemented via a bus interface of one or more processors (e.g., controller/processor 240 or 280) obtaining and/or outputting signals.

The operations 600 begin, at 602, by determining, based on an operating frequency, a beamformer to apply to groups of two or more of elements of a RIS. For example, applying the beamformer to the groups of elements of the RIS may cause at least one of a phase shift or an amplitude change to radio signals re-radiated by each of the groups of elements of the RIS. In some cases, grouping of the two or more elements of the RIS allows for reformulating the RIS for the operating frequency.

At 604, the beamformer is applied to the groups of elements of the RIS to facilitate communications at the operating frequency by re-radiating radio signals via the elements of the RIS.

Figure 7:
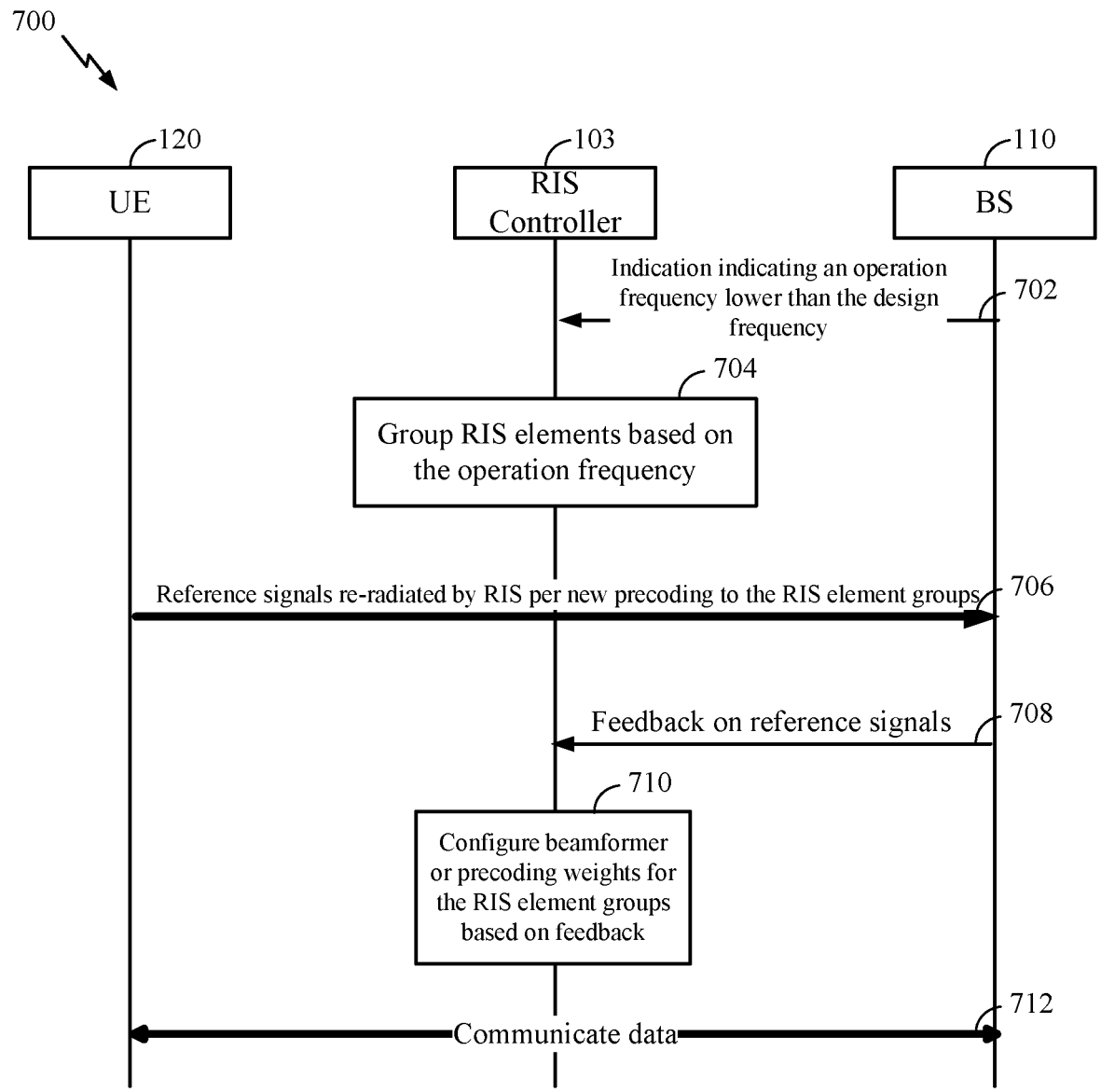
FIG. 7 illustrates an example call flow for changing beamforming types, in accordance with certain aspects of the present disclosure.

Operations 600 may be understood with reference to the call flow diagram 700 in FIG. 7, which shows example signaling and operations of the UE 120, the RIS controller 103, and the BS 110.

At 702, the BS 110 transmits to the RIS controller 103 an indication indicating an operation frequency that is lower than the design frequency (e.g., the original frequency) of the RIS. For example, the RIS is configured to facilitate communications at an original frequency by re-radiating radio signals via the elements of the RIS. Each of the RIS elements has an area A inversely proportional to the original frequency squared. The original frequency may be a highest frequency (e.g., in a specified frequency range) to be used by the BS 110. The highest frequency thus corresponds to a shortest wavelength in the specified frequency range. The area A of an elements of the RIS is a fraction of a wavelength $\lambda$ of the original frequency squared, wherein $A=r^2\lambda^2$, $r^2$ being the fraction.

At 704, the RIS controller 103 groups RIS elements based on the operation frequency. For example, the grouping of RIS elements may be determined based on a ceiling function of a ratio between a wavelength corresponding to the operating frequency squared and the area A, the ceiling function being $\text{ceil}(\lambda_{operating\ frequency}^2/A)$. In some cases, instead of the ceiling function, a floor function may be used. That is, the grouping of RIS elements may be determined based on a floor function of a ratio between a wavelength corresponding to the operating frequency squared and the area A, the floor function being $\text{floor}(\lambda_{operating\ frequency}^2/A)$. Other methods of determination may be used, as discussed herein.

For example, similar formulas may be used for RIS elements of 1-dimension, where wavelengths are used then a ceiling or flooring is applied, i.e., $\text{ceil}(\lambda_0/\lambda_n)$ or $\text{floor}(\lambda_0/\lambda_n)$, then the number of elements within the new area (square area) is decided based on the formula, by selecting square units. In some cases, a rounding function may be used in the place of the ceiling function or the floor function.

At 706, the UE 120 transmits a series of reference signals (RSs) that are re-radiated by the RIS 103 using the new beamformer to the RIS element groups. The BS 110 may provide feedback on the reference signals at 708. At 710, the RIS controller 103 configures the beamformer weights for the RIS element groups based on the feedback received.

In certain aspects, the BS 110 may also transmit, to the RIS controller 103, an index value corresponding to a set of beamformer weights of a plurality of sets of beamformer weights to use for the one or more RIS elements to communicate with the wireless communication device. The index value may be used to identify certain precoding settings corresponding to certain conditions, such that when the conditions recur, the RIS controller may recall the settings using the index value.

At 712, the UE 120 communicates data with the BS 110 via the trained RIS 104.

Figure 8:
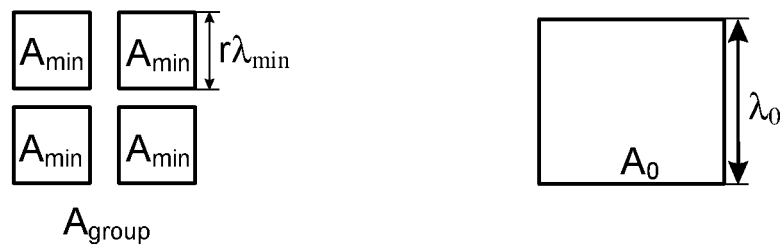
FIG. 8 illustrates an example reformulation of a group of RIS elements to behave as one RIS element for a different operating frequency, in accordance with certain aspects of the present disclosure.

In certain aspects, an example of grouping the RIS elements is shown in FIG. 8. As shown, when the size of the RIS element is designed based on the highest frequency in the specified frequency range, the corresponding wavelength $\lambda_{min}$ is at the minimal value because $\lambda_{min} \cdot f_{original} = c$, c being the speed of light. Using the highest frequency in the specified frequency range is important for attaining full resolution of re-radiation by the RIS. Each RIS element may have a size $A_{min} = r^2 \lambda_{min}^2$. In some examples, r may be arbitrarily determined (e.g., by experiments in a laboratory), such as between $\frac{1}{10}$ and $\frac{1}{5}$, or a similar fraction value.

When there are different operating frequency in the network, which is expected, the RIS may set some elements to equal the same phase/amplitude so that the RIS may mimic a design native to the lower operating frequency. For example, the RIS is reformulated for an operating frequency $f_0$ that is lower than the original frequency, an ideal, hypothetical RIS element design may have an area A' or $A_0$ determined based on the wavelength $\lambda_0$, when $\lambda_0 f_0 = c$. For example, $A_0 = r^2 \lambda_0^2$, r being the fraction used in designing the RIS element size for the original frequency/original. Therefore, suppose the operating frequency is half of the original frequency, $A_0 = r^2 \lambda_0^2 = r^2 (2 \lambda_{min})^2 = 4 A_{min}$. As shown, the group of four RIS elements form the element size $A_{group}$ of the ideal, hypothetical RIS element for the lower operating frequency. As such, the group of four RIS elements may be precoded together as a single RIS element for the operating frequency.

In certain aspects, the RIS controller or the receiver may signal to a transmitter one or more parameters associated with the area A of the RIS element, such as for determining the grouping of the two or more RIS elements.

Figure 9:
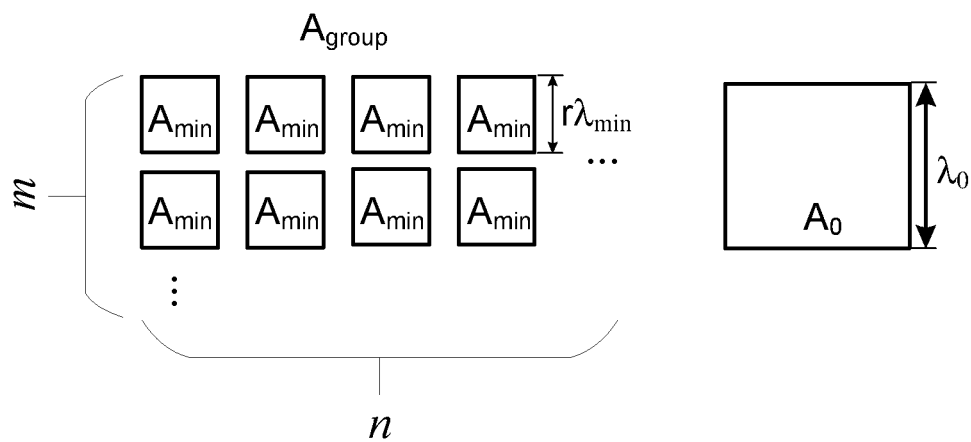
FIG. 9 illustrates an example reformulation of a group of RIS elements using a general function mapping, in accordance with certain aspects of the present disclosure.

In certain aspects, a general mapping function may be used in the place of the previously mentioned ceiling or floor function. An example is shown in FIG. 9. As shown, the grouping of RIS elements may be based on a function $A_{group}(r, \lambda_{min}, \lambda_0)$. For example, the general mapping function may include input of two aspects, a first aspect related to the RIS element area based on the wavelength of the operating frequency $A_n (\lambda_n)$ and a second aspect related to the wavelength of the original frequency $A_o(\lambda_o)$ or related to the wavelengths $\lambda'_i$s (or $\lambda_{min}$, $\lambda_o$ and $r_i$). In some cases, the general mapping function may output the square area that will be used to constitute the equal-coefficient RIS elements.

In some cases, as shown in FIG. 9, the general function may specify a group including m rows and n columns of RIS elements. For example, the general mapping function may output the specific m and n values based on the operating frequency input (and known parameters such as the original frequency and r value). For example, in some cases, such as the example shown in FIG. 8, m=n=2. In some cases, m=1, n=4. In some cases, m=4, n=1. In some cases, m=2, n=4. Other implementations are possible. For example, the group shape needs not be rectangular. The general function may specify a formation of RIS elements in addition to an overall area coverage. For example, the group of RIS elements may form an elliptical (including circular) or triangular shape.

In certain aspects, the general function F ( ) may be based on three variables: the original frequency, a first wavelength, and a second wavelength. For example, the general mapping function may be F ($f_o$, $\lambda_1$, $\lambda_2$) where $f_o = c/\lambda_o$ is the operating carrier/central freq, can output a two-dimensional output. In the two-dimensional output, each of the two dimensions represents the number of elements on vertical axis while the other represents the number of elements on the horizontal axis. As such, optimization methods may be used over time to change the number of elements within a new area, aimed at maximizing the performance. The grouped elements may have the same coefficient weights. For example, a group of two or more RIS elements may be determined based on a product of a first group wavelength and a second group wavelength, wherein the first and the second group wavelengths are respectively a function of a wavelength $\lambda$ corresponding to the original frequency.

In certain aspects, at least one of the groups of two or more of the elements of the RIS is determined based on a ceiling function or a floor function of a ratio between a wavelength of the operating frequency and a wavelength of the original frequency. For example, instead of using the ratio of $A_0$ and $A_{min}$, the ceiling or floor function may be applied to $\lambda_0/\lambda_{min}$. That is, the grouping of the RIS may have a size of $$\mathrm{ceil}\left(\frac{\lambda_o}{\lambda_{min}}\right) A_{min}, \mathrm{floor}\left(\frac{\lambda_o}{\lambda_{min}}\right) A_{min}, \mathrm{ceil}\left(\frac{A_o}{A_{min}}\right) A_{min}, \mathrm{or}\ \mathrm{floor}\left(\frac{A_o}{A_{min}}\right) A_{min}.$$

In some cases, the at least one of the groups of two or more of the elements of the RIS may include a row or a column of a number of the ceiling function or the floor function of the elements of the RIS.

In some cases, the grouping may be determined based on a determination by the network entity (e.g., gNB) or the UE or the RIS controller, using floor function, a ceiling function, or a general mapping function (F( )). In cases of using a general mapping function, the function may be optimized (e.g., via training illustrated in FIGS. 5A and 5B) at either the network entity side or the UE side. In some cases, the general mapping function F( ) may be configured by radio resource control (RRC), medium access control (MAC) control element (CE), or downlink channel information (DCI).

Figure 10:
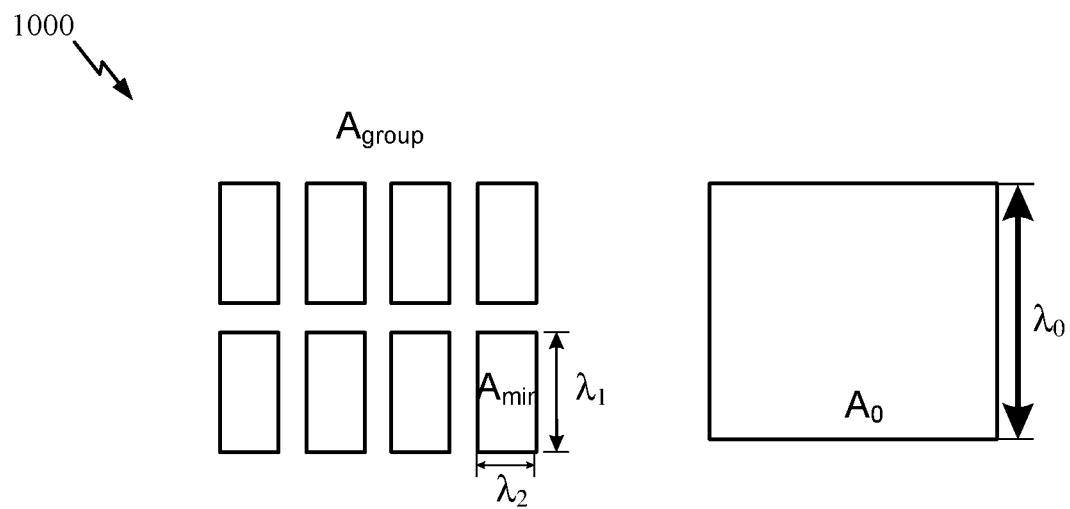
FIG. 10 illustrates an example reformulation of a group of RIS elements each having a rectangular profile, in accordance with certain aspects of the present disclosure.

FIG. 10 illustrates an example reformulation of a group of RIS elements each having a rectangular profile, in accordance with certain aspects of the present disclosure. As shown, the area A of at least one of the elements of the RIS is a product of a first wavelength $\lambda_1$ corresponding to the original frequency, and a second wavelength $\lambda_2$ corresponding to the operating frequency. In some cases, the ratio between the two wavelengths is by design. For example, $\lambda_2/\lambda_1 = r$. The RIS element is rectangular and has an area $A_{min} = \lambda_1 \cdot \lambda_2 = r \lambda_2^2$.

Figure 11:
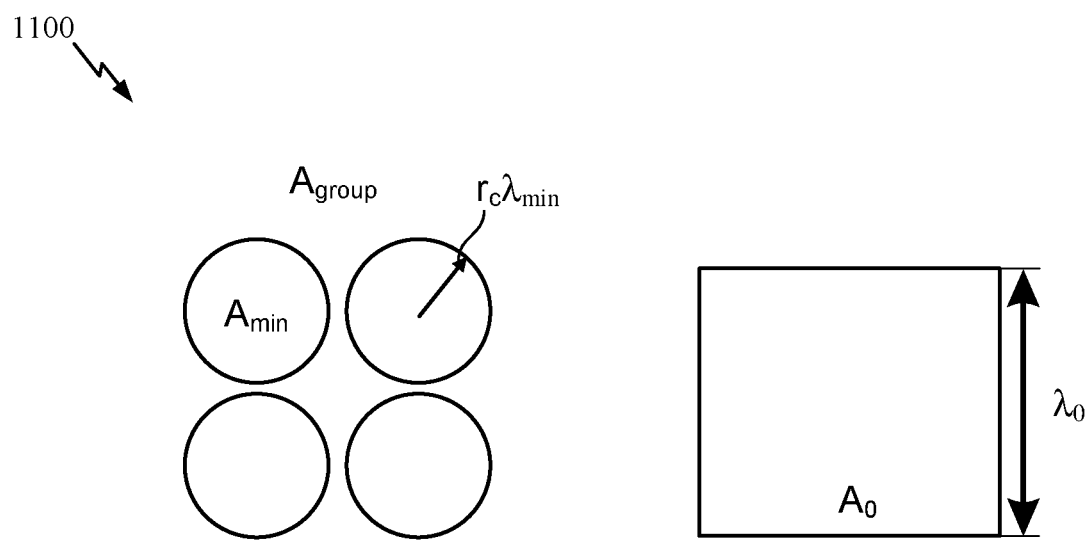
FIG. 11 illustrates an example reformulation of a group of RIS elements each having a circular profile, in accordance with certain aspects of the present disclosure.

FIG. 11 illustrates an example reformulation of a group of RIS elements each having a circular profile, in accordance with certain aspects of the present disclosure. As shown, the area A of at least one of the elements of the RIS is a product of a circular area and a wavelength λ of the original frequency squared, wherein $A=\pi(r_{cl\,\lambda})^2$, $r_c$ being a fraction. The RIS element is in a circular shape.

In certain aspects, the selection or use of RISs may be based on the original design of the elements sizes. That is, a RIS designed based on operating wavelength λ may only be participating in data forwarding whenever the frequency range matching the designed wavelength is used. For example, a transmitter or receiver may select a RIS based on its native operating frequency used in designing its RIS element sizes. Such RIS may operate in NR only or LTE only applications in the designated frequency ranges. Depending on configurations, the RIS may operate in frequency bands within NR frequency ranges (FRs) when the RIS elements are designed to have the associated dimensions. In certain aspects, the RIS selection may be based on indication to RIS's controller from gNB or the controlling UE.

In certain aspects, wherein at least one of the groups of two or more of the elements of the RIS is determined based on a general function configured to output at least one of: an area of at least one of the groups of two or more of the elements of the RIS, or a number of horizontal elements of the RIS and a number vertical elements of the RIS.

In certain aspects, the RIS controller may transmit, to a base station, an indication on a minimum element size of the elements of the RIS corresponding to a highest re-radiation frequency native to the RIS; and may receive, from the base station, a request to participate in communications at the highest re-radiation frequency.

Figure 12:
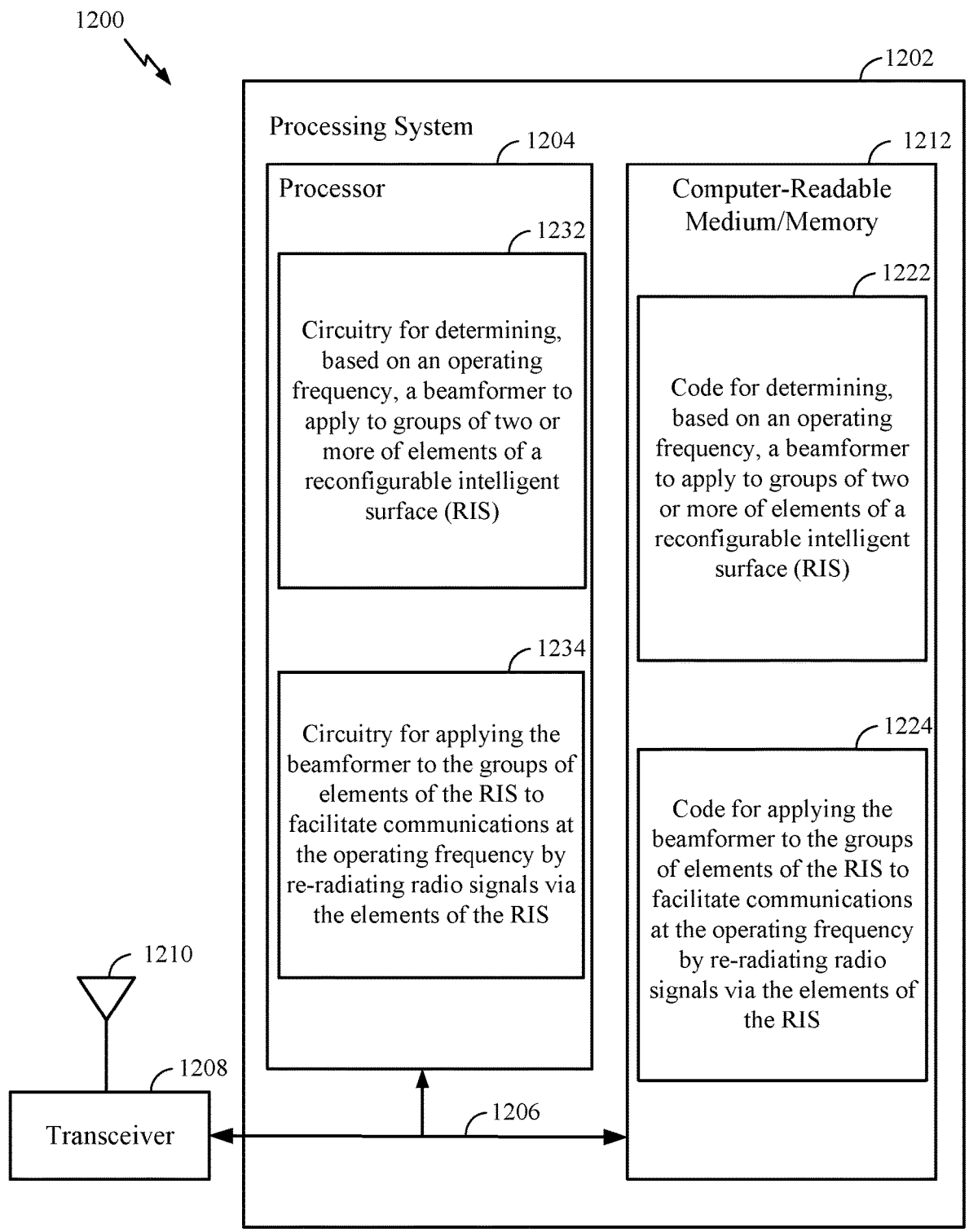
FIG. 12 illustrates a communications device that may include various components configured to perform operations for the techniques disclosed herein.

FIG. 12 illustrates a communications device 1200 that may include various components (e.g., corresponding to means-plus-function components) configured to perform operations for the techniques disclosed herein, such as the operations illustrated in FIG. 6. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 6, or other operations for performing the various techniques discussed herein for indicating precoding types for RIS elements. In certain aspects, computer-readable medium/memory 1212 stores code 1222 for determining, based on an operating frequency, a beamformer to apply to groups of two or more of elements of a reconfigurable intelligent surface (RIS); and code 1224 for applying the beamformer to the groups of elements of the RIS to facilitate communications at the operating frequency by re-radiating radio signals via the elements of the RIS. In certain aspects, the processor 1204 has circuitry configured to implement the code stored in the computer-readable medium/memory 1212. The processor 1204 includes circuitry 1232 for determining, based on an operating frequency, a beamformer to apply to groups of two or more of elements of a reconfigurable intelligent surface (RIS); and circuitry 1234 for applying the beamformer to the groups of elements of the RIS to facilitate communications at the operating frequency by re-radiating radio signals via the elements of the RIS.

Example Aspects

Aspect 1: A method for wireless communications, comprising: determining, based on an operating frequency, a beamformer to apply to groups of two or more of elements of a reconfigurable intelligent surface (RIS); and applying the beamformer to the groups of elements of the RIS to facilitate communications at the operating frequency by re-radiating radio signals via the elements of the RIS.

Aspect 2: The method of Aspect 1, wherein applying the beamformer to the groups of elements of the RIS causes at least one of a phase shift or an amplitude change to radio signals re-radiated by each of the groups of elements of the RIS.

Aspect 3: The method of Aspect 1, wherein the RIS is configured to facilitate communications at an original frequency by re-radiating radio signals via the elements of the RIS, wherein each of the elements of the RIS has an area A inversely proportional to the original frequency squared.

Aspect 4: The method of Aspect 3, wherein the original frequency is a highest frequency used by a base station.

Aspect 5: The method of Aspect 3, wherein the area A of at least one of the elements of the RIS is a fraction of a wavelength λ of the original frequency squared, wherein $A=r^2\lambda^2$, $r^2$ being the fraction.

Aspect 6: The method of Aspect 3, wherein the area A of at least one of the elements of the RIS is a product of a first wavelength corresponding to the original frequency and a second wavelength corresponding to the operating frequency.

Aspect 7: The method of Aspect 6, wherein the at least one of the elements of the RIS is in a rectangular shape.

Aspect 8: The method of Aspect 3, wherein the area A of at least one of the elements of the RIS is a product of a circular area and a wavelength λ of the original frequency squared, wherein $A=\pi(r_c\lambda)^2$, $r_c$ being a fraction.

Aspect 9: The method of Aspect 8, wherein the at least one of the elements of the RIS is in a circular shape.

Aspect 10: The method of Aspect 3, further comprising signaling to a transmitter one or more parameters associated with the area A.

Aspect 11: The method of Aspect 1, wherein at least one of the groups of elements of the RIS has a total area A' inversely proportional to the operation frequency squared.

Aspect 12: The method of Aspect 3, wherein at least one of the groups of two or more of the elements of the RIS is determined based on a ceiling function of a ratio between a wavelength corresponding to the operating frequency squared and the area A, the ceiling function being ceil ($\lambda_{operating\ frequency}^2/A$).

Aspect 13: The method of Aspect 3, wherein at least one of the groups of two or more of the elements of the RIS is determined based on a floor function of a ratio between a wavelength corresponding to the operating frequency squared and the area A, the floor function being floor ($\lambda_{operating\ frequency}^2/A$).

Aspect 14: The method of Aspect 3, wherein at least one of the groups of two or more of the elements of the RIS is determined based on a product of a first group wavelength and a second group wavelength, wherein the first and the second group wavelengths are respectively a function of a wavelength λ corresponding to the original frequency.

Aspect 15: The method of Aspect 3, wherein at least one of the groups of two or more of the elements of the RIS is determined based on a ceiling function or a floor function of a ratio between a wavelength of the operating frequency and a wavelength of the original frequency.

Aspect 16: The method of Aspect 15, wherein the at least one of the groups of two or more of the elements of the RIS comprises a row or a column of a number of the ceiling function or the floor function of the elements of the RIS.

Aspect 17: The method of Aspect 1, wherein at least one of the groups of two or more of the elements of the RIS is determined based on a general function configured to output at least one of: an area of at least one of the groups of two or more of the elements of the RIS, or a number of horizontal elements of the RIS and a number vertical elements of the RIS.

Aspect 18: The method of Aspect 17, wherein the general function is configured by radio resource control (RRC), medium access control control element (MAC CE), or downlink control information (DCI).

Aspect 19: The method of Aspect 1, further comprising training the beamformer to the groups of elements of the RIS to identify a set of beamformer weights based on an area or shape of the groups of elements of the RIS.

Aspect 20: The method of Aspect 1, further comprising: transmitting, to a base station, an indication on a minimum element size of the elements of the RIS corresponding to a highest re-radiation frequency native to the RIS; and receiving, from the base station, a request to participate in communications at the highest re-radiation frequency.

Aspect 21: An apparatus for wireless communication, comprising: at least one processor; and memory coupled to the at least one processor, the memory including code (or instructions) executable by the at least one processor to cause the apparatus to: determine, based on an operating frequency, a beamformer to apply to groups of two or more of elements of a reconfigurable intelligent surface (RIS); and apply the beamformer to the groups of elements of the RIS to facilitate communications at the operating frequency by re-radiating radio signals via the elements of the RIS.

Aspect 22: The apparatus of Aspect 21, wherein the RIS is configured to facilitate communications at an original frequency by re-radiating radio signals via the elements of the RIS, wherein each of the elements of the RIS has an area A inversely proportional to the original frequency squared.

Aspect 23: The apparatus of Aspect 22, wherein the area A of at least one of the elements of the RIS is a fraction of a wavelength λ of the original frequency squared, wherein $A=r^2\lambda^2$, $r^2$ being the fraction.

Aspect 24: The apparatus of Aspect 22, wherein the area A of at least one of the elements of the RIS is a product of a first wavelength corresponding to the original frequency and a second wavelength corresponding to the operating frequency.

Aspect 25: The apparatus of Aspect 22, wherein the area A of at least one of the elements of the RIS is a product of a circular area and a wavelength λ. of the original frequency squared, wherein $A=\pi(r_c\lambda)^2$, $r_c$ being a fraction.

Aspect 26: The apparatus of Aspect 22, further comprising signaling to a transmitter one or more parameters associated with the area A.

Aspect 27: The apparatus of Aspect 21, wherein at least one of the groups of elements of the RIS has a total area A' inversely proportional to the operation frequency squared.

Aspect 28: The apparatus of Aspect 22, wherein at least one of the groups of two or more of the elements of the RIS is determined based on a ceiling function of a ratio between a wavelength corresponding to the operating frequency squared and the area A, the ceiling function being ceil $(\lambda_{operating\ frequency}^2/A)$.

Aspect 29: The apparatus of Aspect 22, wherein at least one of the groups of two or more of the elements of the RIS is determined based on a floor function of a ratio between a wavelength corresponding to the operating frequency squared and the area A, the floor function being floor $(\lambda_{operating\ frequency}^2/A)$.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 6 and FIG. 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
    determining, based on an operating frequency, a beamformer to apply to groups of two or more of elements of a reconfigurable intelligent surface (RIS); and
    applying the beamformer to the groups of elements of the RIS to facilitate communications at the operating frequency by re-radiating radio signals via the elements of the RIS,
    wherein at least one of the groups of elements of the RIS has a total area A' inversely proportional to the operation frequency squared.

2. The method of claim 1, wherein applying the beamformer to the groups of elements of the RIS causes at least one of a phase shift or an amplitude change to radio signals re-radiated by each of the groups of elements of the RIS.

3. The method of claim 1, wherein the RIS is configured to facilitate communications at an original frequency by re-radiating radio signals via the elements of the RIS, wherein each of the elements of the RIS has an area A inversely proportional to the original frequency squared.

4. The method of claim 3, wherein the original frequency is a highest frequency used by a base station.

5. The method of claim 3, wherein the area A of at least one of the elements of the RIS is a fraction of a wavelength $\lambda$ of the original frequency squared, wherein $A=r^2\lambda^2$, $r^2$ being the fraction.

6. The method of claim 3, wherein the area A of at least one of the elements of the RIS is a product of a first wavelength corresponding to the original frequency and a second wavelength corresponding to the operating frequency.

7. The method of claim 6, wherein the at least one of the elements of the RIS is in a rectangular shape.

8. The method of claim 3, wherein the area A of at least one of the elements of the RIS is a product of a circular area and a wavelength $\lambda$ of the original frequency squared, wherein $A=\pi(r_c\lambda)^2$, $r_c$, re being a fraction.

9. The method of claim 8, wherein the at least one of the elements of the RIS is in a circular shape.

10. The method of claim 3, further comprising signaling to a transmitter one or more parameters associated with the area A.

11. The method of claim 3, wherein at least one of the groups of two or more of the elements of the RIS is determined based on a ceiling function of a ratio between a wavelength corresponding to the operating frequency squared and the area A, the ceiling function being ceil $(\lambda_{operating\ frequency}^2/A)$.

12. The method of claim 3, wherein at least one of the groups of two or more of the elements of the RIS is determined based on a floor function of a ratio between a wavelength corresponding to the operating frequency squared and the area A, the floor function being floor $(\lambda_{operating\ frequency}^2/A)$.

13. The method of claim 3, wherein at least one of the groups of two or more of the elements of the RIS is determined based on a product of a first group wavelength and a second group wavelength, wherein the first and the second group wavelengths are respectively a function of a wavelength $\lambda$ corresponding to the original frequency.

14. The method of claim 3, wherein at least one of the groups of two or more of the elements of the RIS is determined based on a ceiling function or a floor function of a ratio between a wavelength of the operating frequency and a wavelength of the original frequency.

15. The method of claim 14, wherein the at least one of the groups of two or more of the elements of the RIS comprises a row or a column of a number of the ceiling function or the floor function of the elements of the RIS.

16. The method of claim 1, wherein at least one of the groups of two or more of the elements of the RIS is determined based on a general function configured to output at least one of:
    an area of at least one of the groups of two or more of the elements of the RIS, or
    a number of horizontal elements of the RIS and a number vertical elements of the RIS.

17. The method of claim 16, wherein the general function is configured by radio resource control (RRC), medium access control control element (MAC CE), or downlink control information (DCI).

18. The method of claim 1, further comprising training the beamformer to the groups of elements of the RIS to identify a set of beamformer weights based on an area or shape of the groups of elements of the RIS.

19. The method of claim 1, further comprising:
    transmitting, to a base station, an indication on a minimum element size of the elements of the RIS corresponding to a highest re-radiation frequency native to the RIS; and
    receiving, from the base station, a request to participate in communications at the highest re-radiation frequency.

20. An apparatus for wireless communication, comprising:
    at least one processor; and
    memory coupled to the at least one processor, the memory including code or instructions executable by the at least one processor to cause the apparatus to:
        determine, based on an operating frequency, a beamformer to apply to groups of two or more of elements of a reconfigurable intelligent surface (RIS); and
        apply the beamformer to the groups of elements of the RIS to facilitate communications at the operating frequency by re-radiating radio signals via the elements of the RIS,
        wherein the RIS is configured to facilitate communications at an original frequency by re-radiating radio signals via the elements of the RIS, wherein each of the elements of the RIS has an area A inversely proportional to the original frequency squared.

21. The apparatus of claim 20, wherein the area A of at least one of the elements of the RIS is a fraction of a wavelength $\lambda$ of the original frequency squared, wherein $A=r^2\lambda^2$, $r^2$ being the fraction.

22. The apparatus of claim 20, wherein the area A of at least one of the elements of the RIS is a product of a first wavelength corresponding to the original frequency and a second wavelength corresponding to the operating frequency.

23. The apparatus of claim 20, wherein the area A of at least one of the elements of the RIS is a product of a circular area and a wavelength $\lambda$ of the original frequency squared, wherein $A=\pi(r_c\lambda)^2$, $r_c$ being a fraction.

24. The apparatus of claim 20, further comprising signaling to a transmitter one or more parameters associated with the area A.

25. The apparatus of claim 20, wherein at least one of the groups of elements of the RIS has a total area A' inversely proportional to the operation frequency squared.

26. The apparatus of claim 20, wherein at least one of the groups of two or more of the elements of the RIS is determined based on a ceiling function of a ratio between a wavelength corresponding to the operating frequency squared and the area A, the ceiling function being ceil $(\lambda_{operating\ frequency}^2/A)$.

27. The apparatus of claim 20, wherein at least one of the groups of two or more of the elements of the RIS is determined based on a floor function of a ratio between a wavelength corresponding to the operating frequency squared and the area A, the floor function being floor $(\lambda_{operating\ frequency}^2/A)$.

28. An apparatus for wireless communication, comprising:

at least one processor; and memory coupled to the at least one processor, the memory including code or instructions executable by the at least one processor to cause the apparatus to:

determine, based on an operating frequency, a beamformer to apply to groups of two or more of elements of a reconfigurable intelligent surface (RIS);

apply the beamformer to the groups of elements of the RIS to facilitate communications at the operating frequency by re-radiating radio signals via the elements of the RIS; and train the beamformer to the groups of elements of the RIS to identify a set of beamformer weights based on an area or shape of the groups of elements of the RIS.

* * * * *